US012789390B2

(12) United States Patent
Murphy et al.

(10) Patent No.: US 12,789,390 B2
(45) Date of Patent: Nov. 10, 2026

(54) SAFETY SYSTEMS AND METHODS FOR AN INTEGRATED MOBILE MANIPULATOR ROBOT

(71) Applicant: Boston Dynamics, Inc., Waltham, MA (US)

(72) Inventors: Michael Murphy, Carlisle, MA (US); Federico Vicentini, Lexington, MA (US); Matthew Paul Meduna, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 542 days.

(21) Appl. No.: 17/699,542

(22) Filed: Mar. 21, 2022

(65) Prior Publication Data

US 2022/0305667 A1 Sep. 29, 2022

Related U.S. Application Data

(60) Provisional application No. 63/166,875, filed on Mar. 26, 2021.

(51) Int. Cl.
*B25J 13/08* (2006.01)
*B25J 5/00* (2006.01)
*B25J 9/16* (2006.01)

(52) U.S. Cl.
CPC ............. *B25J 13/086* (2013.01); *B25J 5/007* (2013.01); *B25J 9/1674* (2013.01); *B25J 9/1697* (2013.01)

(58) Field of Classification Search
None
See application file for complete search history.

(56) References Cited

U.S. PATENT DOCUMENTS 4,789,295 A 12/1988 Boucher, Jr. et al.
6,588,574 B2 7/2003 Koini et al.
7,153,085 B2 12/2006 Clark et al.
8,295,980 B2 10/2012 Williamson
8,965,563 B2 2/2015 Eldershaw et al.
9,004,846 B2 4/2015 La Rovere et al.
9,089,969 B1 7/2015 Theobald
9,102,053 B2 8/2015 Suzuki
(Continued)

FOREIGN PATENT DOCUMENTS

CN 106363668 A 2/2017
CN 108983783 A 12/2018
(Continued)

OTHER PUBLICATIONS

International Search Report and Written Opinion mailed Aug. 30, 2022, in connection with International Application No. PCT/US2022/021144.
(Continued)

*Primary Examiner* — Arslan Azhar
(74) *Attorney, Agent, or Firm* — Pierce Atwood LLP

(57) ABSTRACT

A robot comprises a mobile base, a robotic arm operatively coupled to the mobile base, a plurality of distance sensors, at least one antenna configured to receive one or more signals from a monitoring system external to the robot, and a computer processor. The computer processor is configured to limit one or more operations of the robot when it is determined that the one or more signals are not received by the at least one antenna.

16 Claims, 11 Drawing Sheets

(56) References Cited

U.S. PATENT DOCUMENTS

| | | | |
|---|---|---|---|
| 9,233,470 | B1 | 1/2016 | Bradski et al. |
| 9,358,975 | B1 | 6/2016 | Watts |
| 9,434,558 | B2 | 9/2016 | Criswell |
| 9,451,810 | B2 | 9/2016 | Regan et al. |
| 9,481,530 | B2 | 11/2016 | Brandmüller et al. |
| 9,487,361 | B2 | 11/2016 | Girtman et al. |
| 9,493,316 | B2 | 11/2016 | Girtman et al. |
| 9,503,704 | B2 | 11/2016 | Ando |
| 9,519,882 | B2 | 12/2016 | Galluzzo et al. |
| 9,561,794 | B2 | 2/2017 | Watts |
| 9,604,363 | B2 | 3/2017 | Ban |
| 9,623,558 | B1 | 4/2017 | Stubbs et al. |
| 9,688,489 | B1 | 6/2017 | Zevenbergen et al. |
| 9,744,669 | B2 | 8/2017 | Wicks et al. |
| 9,875,911 | B2 | 1/2018 | Pagaila et al. |
| 9,919,872 | B2 | 3/2018 | Khodl et al. |
| 9,940,604 | B2 | 4/2018 | Galluzzo et al. |
| 9,969,573 | B2 | 5/2018 | Girtman et al. |
| 9,987,746 | B2 | 6/2018 | Bradski et al. |
| 10,005,627 | B2 | 6/2018 | Girtman et al. |
| 10,071,856 | B2 | 9/2018 | Hance et al. |
| 10,081,106 | B2 | 9/2018 | Rublee et al. |
| 10,108,185 | B1 | 10/2018 | Theobald |
| 10,122,995 | B2 | 11/2018 | Rublee et al. |
| 10,124,489 | B2 | 11/2018 | Chitta et al. |
| 10,124,967 | B2 | 11/2018 | Girtman et al. |
| 10,147,069 | B2 | 12/2018 | Galluzzo et al. |
| 10,216,865 | B1 | 2/2019 | Theobald |
| 10,239,210 | B2 | 3/2019 | Morency et al. |
| 10,343,857 | B2 | 7/2019 | Morency et al. |
| 10,417,521 | B2 | 9/2019 | Dong |
| 10,459,449 | B2 | 10/2019 | Watts |
| 10,518,973 | B2 | 12/2019 | Hance et al. |
| 10,661,444 | B2 | 5/2020 | McCollum et al. |
| 10,766,149 | B2 | 9/2020 | Marchese et al. |
| 10,773,387 | B2 | 9/2020 | Rublee et al. |
| 10,793,047 | B1 | 10/2020 | Theobald |
| 11,467,601 | B2 * | 10/2022 | Sorensen ............. G05D 1/0274 |
| 11,548,159 | B1 * | 1/2023 | Ebrahimi Afrouzi ..... G06T 7/13 |
| 11,642,782 | B2 * | 5/2023 | Saito ........................ B25J 9/162 700/253 |
| 11,896,987 | B1 * | 2/2024 | Kinne ................... B05B 13/041 |
| 2006/0182607 | A1 | 8/2006 | Clark et al. |
| 2013/0017053 | A1 | 1/2013 | Forget et al. |
| 2014/0079524 | A1 | 3/2014 | Shimono et al. |
| 2015/0066199 | A1 | 3/2015 | Shimono |
| 2016/0124433 | A1 | 5/2016 | Cavender-Bares |
| 2016/0221187 | A1 | 8/2016 | Bradski et al. |
| 2018/0065255 | A1 | 3/2018 | Usui |
| 2018/0178377 | A1 * | 6/2018 | Yang ...................... B25J 9/0009 |
| 2018/0222695 | A9 | 8/2018 | Girtman et al. |
| 2019/0107606 | A1 * | 4/2019 | Russell ................... G01S 17/26 |
| 2019/0204851 | A1 * | 7/2019 | Afrouzi ................. A47L 9/0405 |
| 2019/0262993 | A1 * | 8/2019 | Cole ....................... B25J 9/1676 |
| 2020/0206896 | A1 * | 7/2020 | Wong ................... B25J 15/0019 |
| 2020/0316786 | A1 | 10/2020 | Galuzzo et al. |
| 2020/0376689 | A1 | 12/2020 | Rembisz et al. |

FOREIGN PATENT DOCUMENTS

| | | | |
|---|---|---|---|
| CN | 110385701 | A | 10/2019 |
| CN | 210895126 | U | 6/2020 |
| CN | 111811498 | A | 10/2020 |
| JP | 2000263489 | A | 9/2000 |
| JP | 3 446650 | B2 | 9/2003 |
| JP | 2008087101 | A | 4/2008 |
| JP | 4 658891 | B2 | 3/2011 |
| WO | 1998051598 | A1 | 11/1998 |
| WO | 2014041318 | A1 | 3/2014 |
| WO | 2014111633 | A1 | 7/2014 |
| WO | 2014113762 | A1 | 7/2014 |
| WO | 2014186781 | A1 | 11/2014 |
| WO | 2015017444 | A1 | 2/2015 |
| WO | 2015035300 | A1 | 3/2015 |
| WO | 2015187975 | A1 | 12/2015 |
| WO | 2016014917 | A1 | 1/2016 |
| WO | 2016033172 | A1 | 3/2016 |
| WO | 2017146895 | A1 | 8/2017 |
| WO | 2018022265 | A1 | 2/2018 |
| WO | 2010034044 | A2 | 4/2020 |

OTHER PUBLICATIONS

International Preliminary Report on Patentability for International Application No. PCT/US2022/021144 dated Sep. 12, 2023; 11 pages.

Notice of Preliminary Rejection from the Korean Patent Office Mailed Jan. 27, 2026 for Korean Patent Application No. 10-2023-7036822, 10 pages.

* cited by examiner

SAFETY SYSTEMS AND METHODS FOR AN INTEGRATED MOBILE MANIPULATOR ROBOT

CROSS-REFERENCE TO RELATED APPLICATIONS

This application claims priority under 35 U.S.C. § 119(e) to U.S. Provisional Application Ser. No. 63/166,875, filed Mar. 26, 2021, titled, "SAFETY SYSTEMS AND METHODS FOR AN INTEGRATED MOBILE MANIPULATOR ROBOT," which is incorporated by reference in its entirety herein.

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction-based mechanisms), or some combination of a manipulator and a mobile robot. Robots are utilized in a variety of industries including, for example, manufacturing, warehouse logistics, transportation, hazardous environments, exploration, and healthcare.

SUMMARY

Some embodiments relate to a robot comprising a mobile base, a robotic arm operatively coupled to the mobile base, a plurality of distance sensors, at least one antenna configured to receive one or more signals from a monitoring system external to the robot, and a computer processor. The computer processor is configured to limit one or more operations of the robot when it is determined that the one or more signals are not received by the at least one antenna.

In one aspect, the plurality of distance sensors comprise a plurality of LiDAR sensors. In another aspect, the mobile base is rectangular, and at least one of the plurality of distance sensors is disposed on each side of the mobile base. In another aspect, a field of view of each distance sensor of the plurality of distance sensors at least partially overlaps with a field of view of at least one other distance sensor of the plurality of distance sensors. In another aspect, the field of view of each distance sensor of the plurality of distance sensors at least partially overlaps with a field of view of each of at least two other distance sensors of the plurality of distance sensors. In another aspect, a first field of view of a first distance sensor of the plurality of distance sensors at least partially overlaps with a second field of view of a second distance sensor of the plurality of distance sensors and a third field of view of a third distance sensor of the plurality of distance sensors, and a fourth field of view of a fourth distance sensor of the plurality of distance sensors at least partially overlaps with the second and third fields of view. In another aspect, the mobile base comprises four sides, the first distance sensor is disposed on a first side of the four sides of the mobile base, the second distance sensor is disposed on a second side of the four sides of the mobile base, the third distance sensor is disposed on a third side of the four sides of the mobile base, and the fourth distance sensor is disposed on a fourth side of the four sides of the mobile base. In another aspect, the first and fourth fields of view do not overlap, and wherein the second and third fields of view do not overlap. In another aspect, each distance sensor of the plurality of distance sensors is associated with a field of view, and a combined field of view that includes the fields of view from all of the plurality of distance sensors is a 360-degree field of view.

In one aspect, the robot further comprises a wheeled accessory coupled to the mobile base. In another aspect, a wheel of the wheeled accessory occludes an area of a first field of view of a first distance sensor of the plurality of distance sensors, and wherein a second field of view of a second distance sensor of the plurality of distance sensors includes at least a portion of the occluded area of the first field of view. In another aspect, the at least one antenna is configured to receive the one or more signals wirelessly. In another aspect, the robot further comprises a perception mast operatively coupled to the mobile base, the perception mast comprises a plurality of sensors, and the at least one antenna is mounted on the perception mast.

Some embodiments relate to a method of safely operating a robot within an area of a warehouse. The method comprises determining a location of the robot within the area, and adjusting an operation of the robot based, at least in part, on the determined location within the area.

In one aspect, adjusting the operation of the robot comprises adjusting a speed limit of a robotic arm of the robot. In another aspect, adjusting the operation of the robot comprises adjusting a speed limit of a mobile base of the robot. In another aspect, adjusting the operation of the robot comprises adjusting the speed limit of the robotic arm and adjusting a speed limit of a mobile base of the robot. In another aspect, adjusting the operation of the robot comprises adjusting a direction of motion of the robot. In another aspect, adjusting the operation of the robot comprises adjusting an orientation of the robot. In another aspect, determining the location of the robot within the area comprises determining a zone of the area within which the robot is located. In another aspect, determining the zone of the area comprises sensing a zone ID tag. In another aspect, adjusting the operation of the robot comprises adjusting the operation of the robot based, at least in part, on a sensed zone ID tag.

In one aspect, the method further comprises receiving authorization from a central monitoring system to adjust the operation of the robot, and adjusting the operation of the robot based, at least in part, on the determined location within the area comprises adjusting the operation of the robot based, at least in part, on the determined location within the area and the received authorization. In another aspect, the area of the warehouse is an aisle of the warehouse. In another aspect, the area of the warehouse is an area surrounding a conveyor. In another aspect, the area of the warehouse is a loading dock of the warehouse.

Some embodiments relate to a method of setting a buffer zone for a robot within which the robot can safely operate. The method comprises determining a position and velocity of a mobile base of the robot, determining a position and velocity of a robotic arm of the robot, and setting the buffer zone for the robot based, at least in part, on the determined position and velocity of the mobile base and the determined position and velocity of the robotic arm.

In one aspect, the method further comprises adjusting the buffer zone for the robot upon determining a change in one or more of the position of the mobile base, the velocity of the mobile base, the position of the robotic arm, and the velocity of the robotic arm. In another aspect, the method further comprises initiating safety protocols upon detecting an unanticipated environmental change. In another aspect, detecting the unanticipated environmental change comprises detecting an unanticipated object within the buffer zone.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
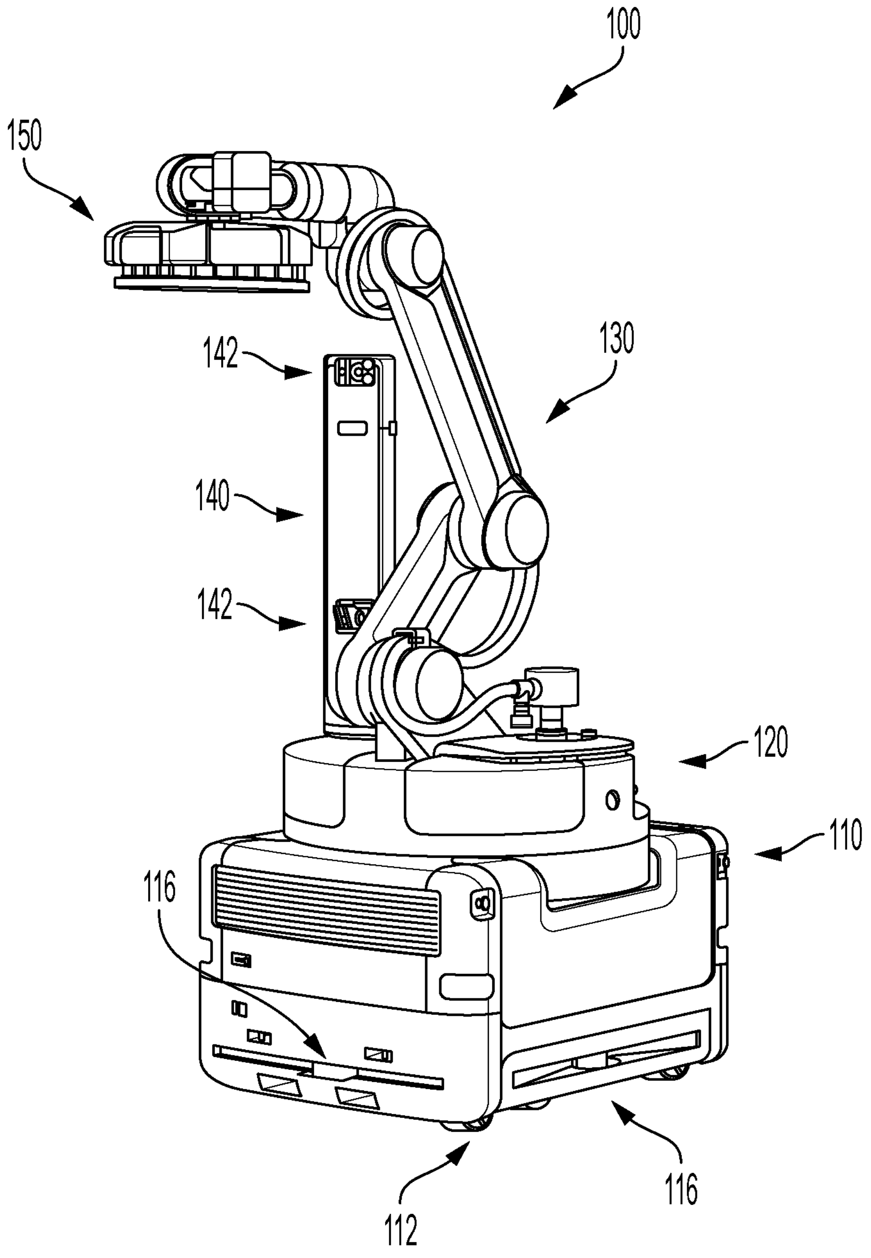
FIG. 1A is a perspective view of one embodiment of a robot.

Robots are typically configured to perform various tasks in an environment in which they are placed. Generally, these tasks include interacting with objects and/or the elements of the environment. Notably, robots are becoming popular in warehouse and logistics operations. Before the introduction of robots to such spaces, many operations were performed manually. For example, a person might manually unload boxes from a truck onto one end of a conveyor belt, and a second person at the opposite end of the conveyor belt might organize those boxes onto a pallet. The pallet may then be picked up by a forklift operated by a third person, who might drive to a storage area of the warehouse and drop the pallet for a fourth person to remove the individual boxes from the pallet and place them on shelves in the storage area. More recently, robotic solutions have been developed to automate many of these functions. Such robots may either be specialist robots (i.e., designed to perform a single task, or a small number of closely related tasks) or generalist robots (i.e., designed to perform a wide variety of tasks). To date, both specialist and generalist warehouse robots have been associated with significant limitations, as explained below.

A specialist robot may be designed to perform a single task, such as unloading boxes from a truck onto a conveyor belt. While such specialized robots may be efficient at performing their designated task, they may be unable to perform other, tangentially related tasks in any capacity. As such, either a person or a separate robot (e.g., another specialist robot designed for a different task) may be needed to perform the next task(s) in the sequence. As such, a warehouse may need to invest in multiple specialized robots to perform a sequence of tasks, or may need to rely on a hybrid operation in which there are frequent robot-to-human or human-to-robot handoffs of objects.

In contrast, a generalist robot may be designed to perform a wide variety of tasks, and may be able to take a box through a large portion of the box's life cycle from the truck to the shelf (e.g., unloading, palletizing, transporting, depalletizing, storing). While such generalist robots may perform a variety of tasks, they may be unable to perform individual tasks with high enough efficiency or accuracy to warrant introduction into a highly streamlined warehouse operation. For example, while mounting an off-the-shelf robotic manipulator onto an off-the-shelf mobile robot might yield a system that could, in theory, accomplish many warehouse tasks, such a loosely integrated system may be incapable of performing complex or dynamic motions that require coordination between the manipulator and the mobile base, resulting in a combined system that is inefficient and inflexible. Typical operation of such a system within a warehouse environment may include the mobile base and the manipulator operating sequentially and (partially or entirely) independently of each other. For example, the mobile base may first drive toward a stack of boxes with the manipulator powered down. Upon reaching the stack of boxes, the mobile base may come to a stop, and the manipulator may power up and begin manipulating the boxes as the base remains stationary. After the manipulation task is completed, the manipulator may again power down, and the mobile base may drive to another destination to perform the next task. As should be appreciated from the foregoing, the mobile base and the manipulator in such systems are effectively two separate robots that have been joined together; accordingly, a controller associated with the manipulator may not be configured to share information with, pass commands to, or receive commands from a separate controller associated with the mobile base. As such, such a poorly integrated mobile manipulator robot may be forced to operate both its manipulator and its base at suboptimal speeds or through suboptimal trajectories, as the two separate controllers struggle to work together. Additionally, while there are limitations that arise from a purely engineering perspective, there are additional limitations that must be imposed to comply with safety regulations. For instance, if a safety regulation requires that a mobile manipulator must be able to be completely shut down within a certain period of time when a human enters a region within a certain distance of the robot, a loosely integrated mobile manipulator robot may not be able to act sufficiently quickly to ensure that both the manipulator and the mobile base (individually and in aggregate) do not a pose a threat to the human. To ensure that such loosely integrated systems operate within required safety constraints, such systems are forced to operate at even slower speeds or to execute even more conservative trajectories than those limited speeds and trajectories as already imposed by the engineering problem. As such, the speed and efficiency of generalist robots performing tasks in warehouse environments to date have been limited.

In view of the above, the inventors have recognized and appreciated that a highly integrated mobile manipulator robot with system-level mechanical design and holistic control strategies between the manipulator and the mobile base may be associated with certain benefits in warehouse and/or logistics operations. Such an integrated mobile manipulator robot may be able to perform complex and/or dynamic motions that are unable to be achieved by conventional, loosely integrated mobile manipulator systems. Additionally, such an integrated mobile manipulator robot may be able to implement safety protocols through holistic control strategies, obviating the need to impose strict, artificial limits on the operation of the mobile base and/or the manipulator. As a result, this type of robot may be well suited to perform a variety of different tasks (e.g., within a warehouse environment) with speed, agility, and efficiency.

Example Robot Overview

In this section, an overview of some components of one embodiment of a highly integrated mobile manipulator robot configured to perform a variety of tasks is provided to explain the interactions and interdependencies of various subsystems of the robot. Each of the various subsystems, as well as control strategies for operating the subsystems, are described in further detail in the following sections.

Figure 1B:
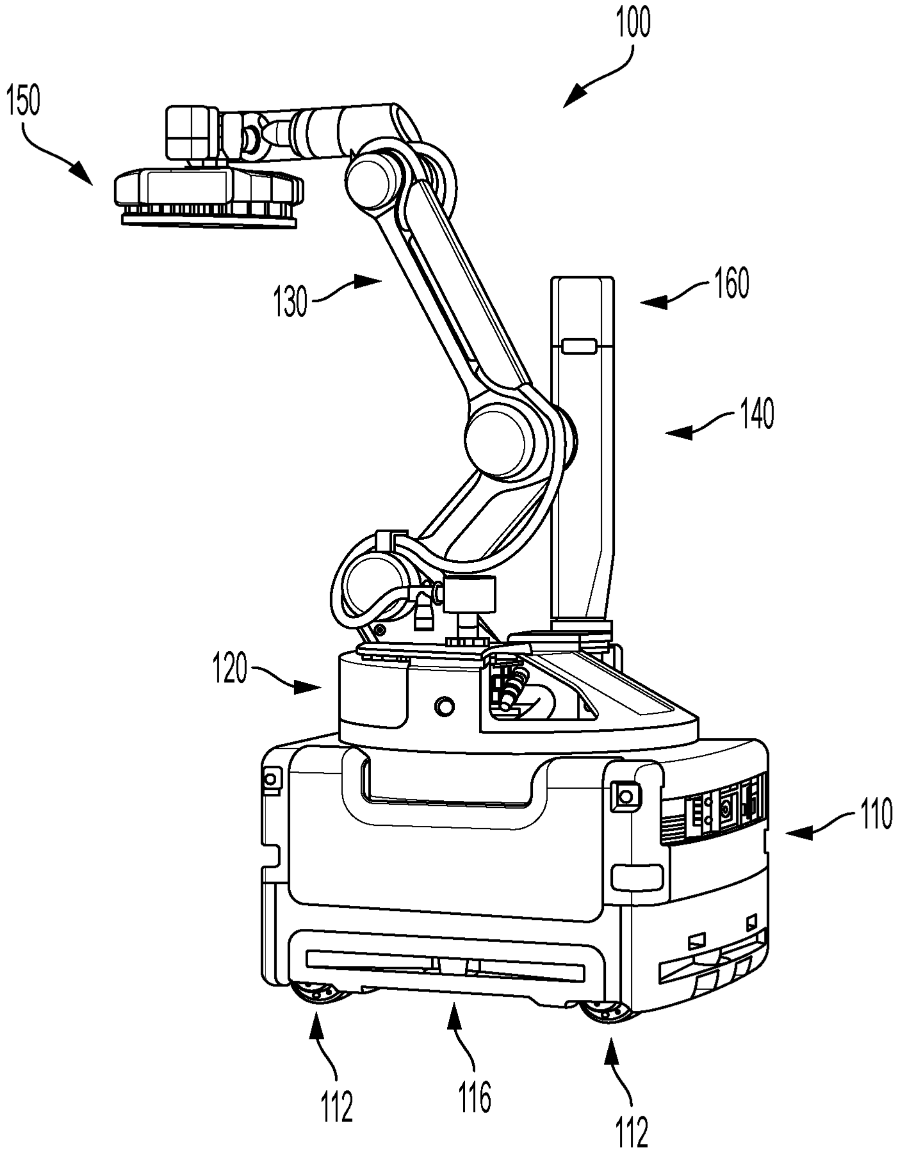
FIG. 1B is another perspective view of the robot of FIG. 1A.

FIGS. 1A and 1B are perspective views of one embodiment of a robot 100. The robot 100 includes a mobile base 110 and a robotic arm 130. The mobile base 110 includes an omnidirectional drive system that enables the mobile base to translate in any direction within a horizontal plane as well as rotate about a vertical axis perpendicular to the plane. Each wheel 112 of the mobile base 110 is independently steerable and independently drivable. The mobile base 110 additionally includes a number of distance sensors 116 that assist the robot 100 in safely moving about its environment. The robotic arm 130 is a 6 degree of freedom (6-DOF) robotic arm including three pitch joints and a 3-DOF wrist. An end effector 150 is disposed at the distal end of the robotic arm 130. The robotic arm 130 is operatively coupled to the mobile base 110 via a turntable 120, which is configured to rotate relative to the mobile base 110. In addition to the robotic arm 130, a perception mast 140 is also coupled to the turntable 120, such that rotation of the turntable 120 relative to the mobile base 110 rotates both the robotic arm 130 and the perception mast 140. The robotic arm 130 is kinematically constrained to avoid collision with the perception mast 140. The perception mast 140 is additionally configured to rotate relative to the turntable 120, and includes a number of perception modules 142 configured to gather information about one or more objects in the robot's environment. In some embodiments, the perception mast 140 may additionally include lights, speakers, or other indicators configured to alert people in the vicinity of the robot of the robot's presence and/or intent. The robot 100 additionally includes at least one antenna 160 configured to receive signals from a monitoring system that is external to the robot 100. In some embodiments, the antenna 160 is mounted on the perception mast 140. The integrated structure and system-level design of the robot 100 enable fast and efficient operation in a number of different applications, some of which are provided below as examples.

Figure 2A:
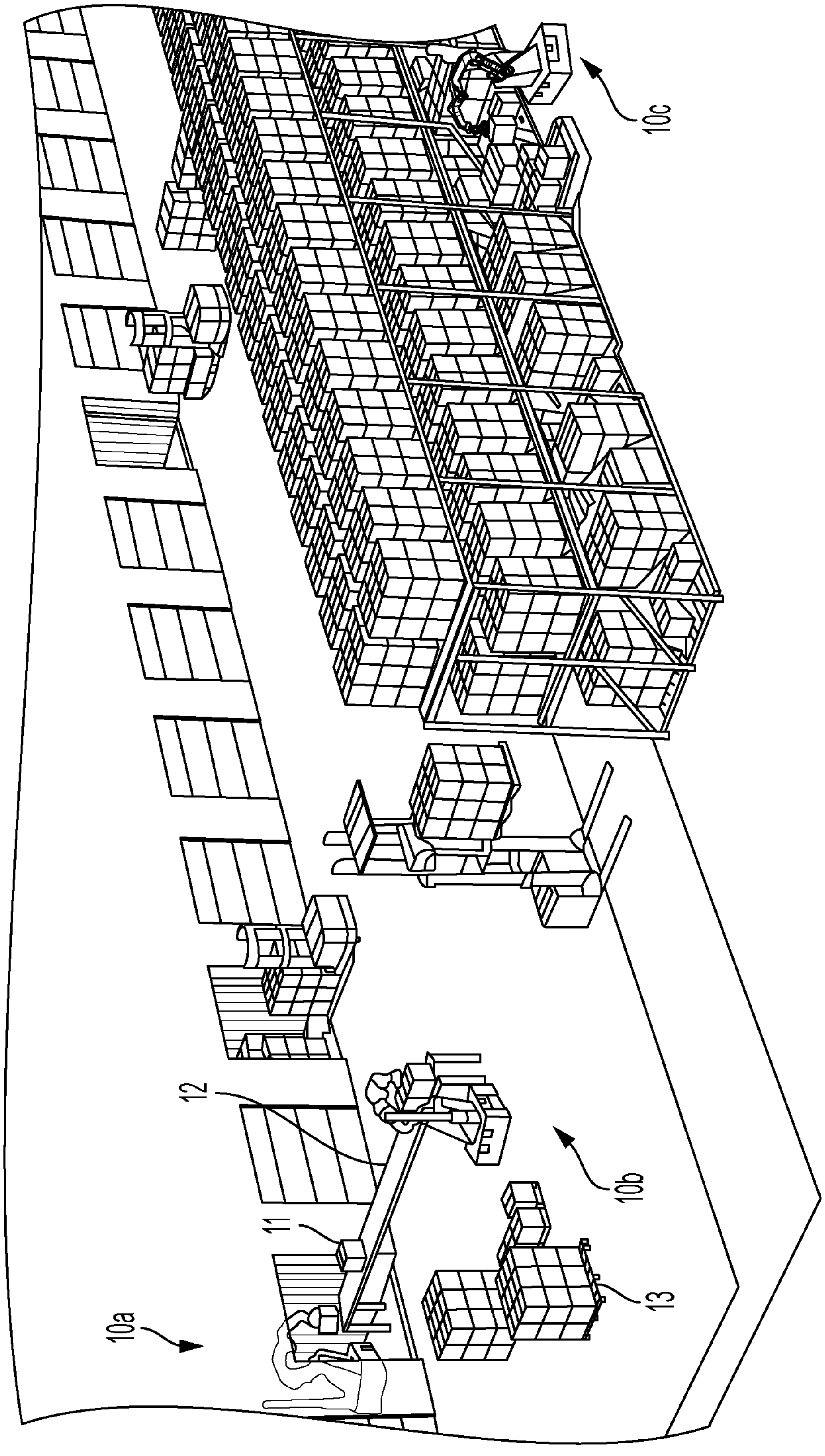
FIG. 2A depicts robots performing tasks in a warehouse environment.

FIG. 2A depicts robots 10*a*, 10*b*, and 10*c* performing different tasks within a warehouse environment. A first robot 10*a* is inside a truck (or a container), moving boxes 11 from a stack within the truck onto a conveyor belt 12 (this particular task will be discussed in greater detail below in reference to FIG. 2B). At the opposite end of the conveyor belt 12, a second robot 10*b* organizes the boxes 11 onto a pallet 13. In a separate area of the warehouse, a third robot 10*c* picks boxes from shelving to build an order on a pallet (this particular task will be discussed in greater detail below in reference to FIG. 2C). It should be appreciated that the robots 10*a*, 10*b*, and 10*c* are different instances of the same robot (or of highly similar robots). Accordingly, the robots described herein may be understood as specialized multi-purpose robots, in that they are designed to perform specific tasks accurately and efficiently, but are not limited to only one or a small number of specific tasks.

Figure 2B:
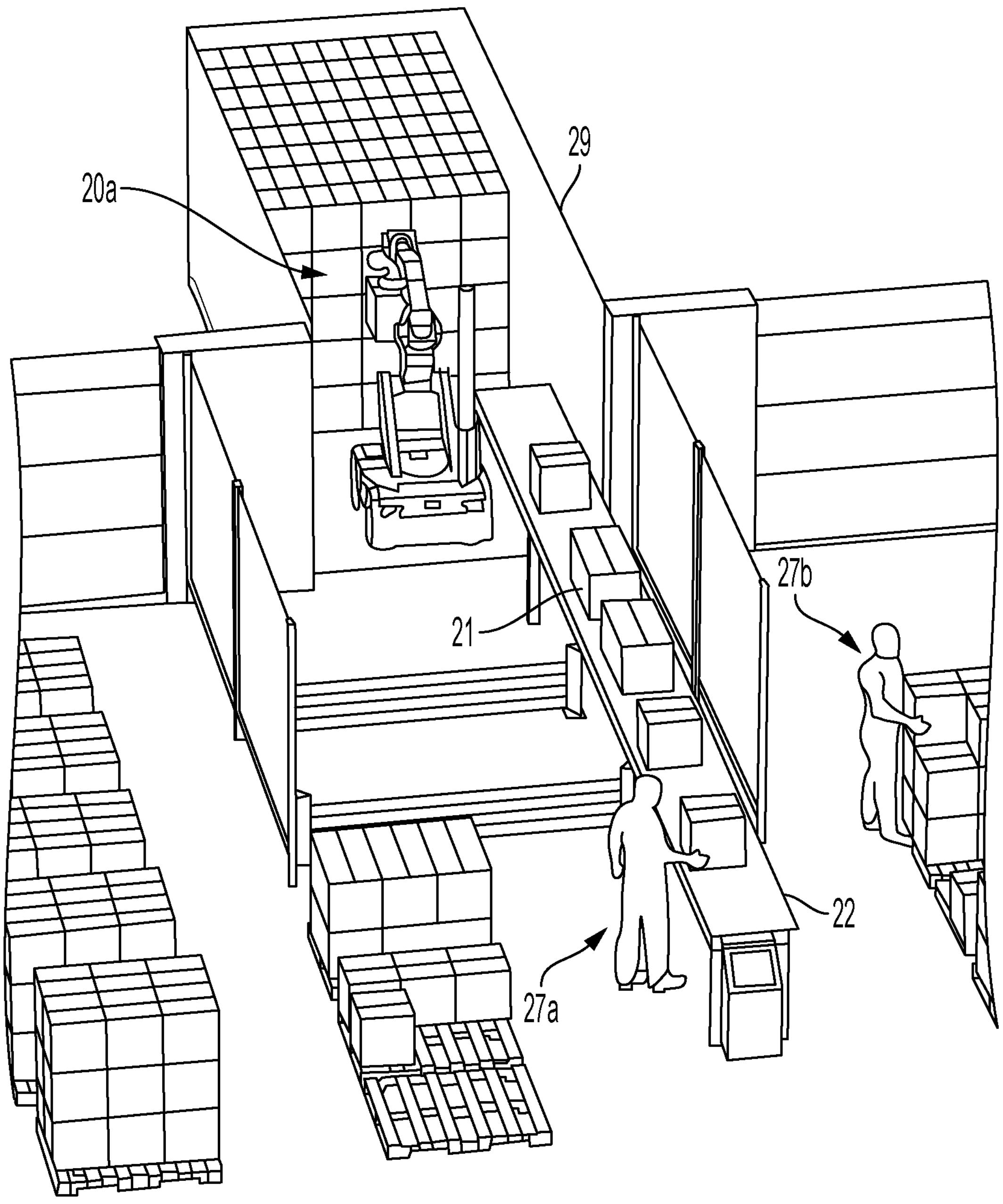
FIG. 2B depicts a robot unloading boxes from a truck.

FIG. 2B depicts a robot 20*a* unloading boxes 21 from a truck 29 and placing them on a conveyor belt 22. In this box picking application (as well as in other box picking applications), the robot 20*a* will repetitiously pick a box, rotate, place the box, and rotate back to pick the next box. Although robot 20*a* of FIG. 2B is a different embodiment from robot 100 of FIGS. 1A and 1B, referring to the components of robot 100 identified in FIGS. 1A and 1B will ease explanation of the operation of the robot 20*a* in FIG. 2B. During operation, the perception mast of robot 20*a* (analogous to the perception mast 140 of robot 100 of FIGS. 1A and 1B) may be configured to rotate independent of rotation of the turntable (analogous to the turntable 120) on which it is mounted to enable the perception modules (akin to perception modules 142) mounted on the perception mast to capture images of the environment that enable the robot 20*a* to plan its next movement while simultaneously executing a current movement. For example, while the robot 20*a* is picking a first box from the stack of boxes in the truck 29, the perception modules on the perception mast may point at and gather information about the location where the first box is to be placed (e.g., the conveyor belt 22). Then, after the turntable rotates and while the robot 20*a* is placing the first box on the conveyor belt, the perception mast may rotate (relative to the turntable) such that the perception modules on the perception mast point at the stack of boxes and gather information about the stack of boxes, which is used to determine the second box to be picked. As the turntable rotates back to allow the robot to pick the second box, the perception mast may gather updated information about the area surrounding the conveyor belt. In this way, the robot 20*a* may parallelize tasks which may otherwise have been performed sequentially, thus enabling faster and more efficient operation.

Also of note in FIG. 2B is that the robot 20*a* is working alongside humans (e.g., workers 27*a* and 27*b*). Given that the robot 20*a* is configured to perform many tasks that have traditionally been performed by humans, the robot 20*a* is designed to have a small footprint, both to enable access to areas designed to be accessed by humans, and to minimize the size of a safety zone around the robot into which humans are prevented from entering.

Figure 2C:
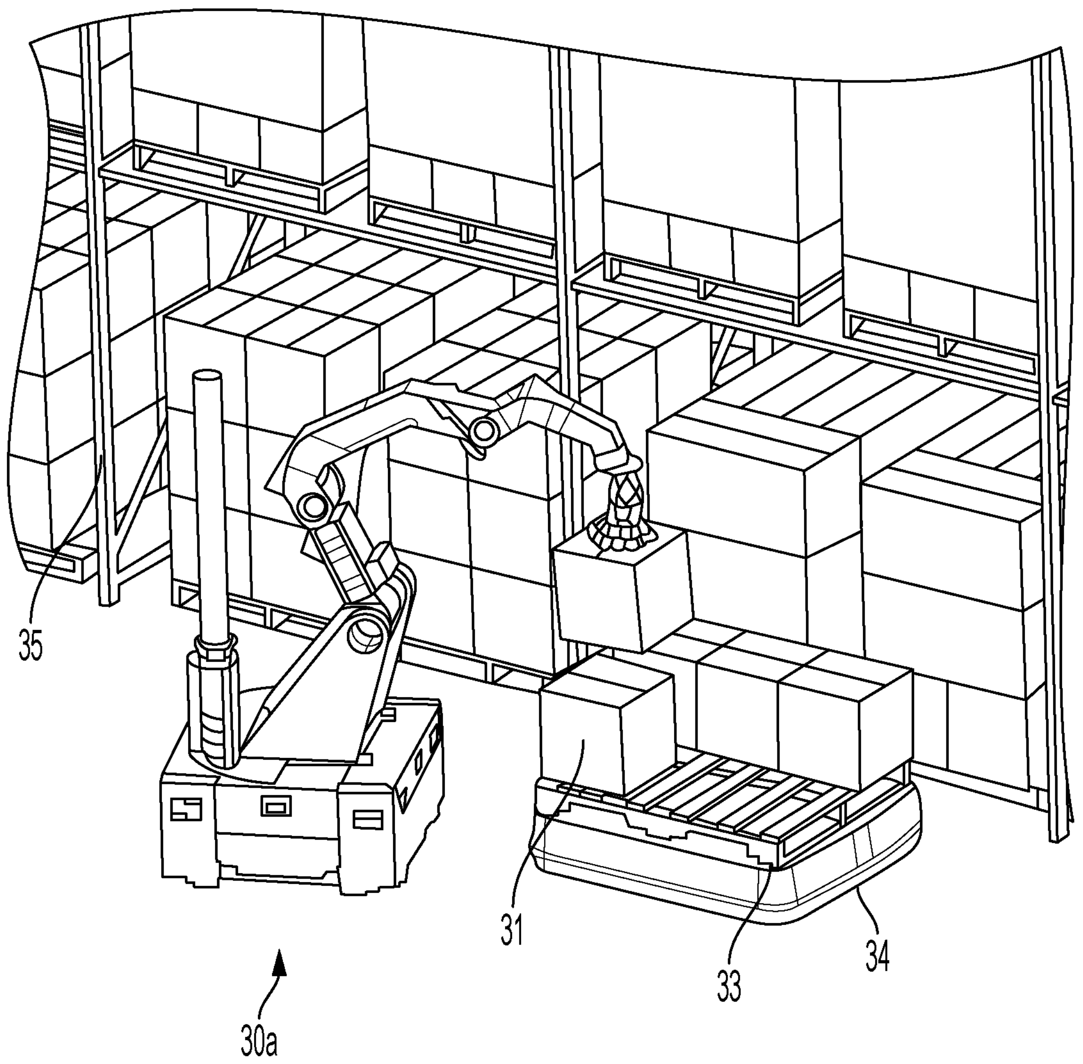
FIG. 2C depicts a robot building a pallet in a warehouse aisle.

FIG. 2C depicts a robot 30*a* performing an order building task, in which the robot 30*a* places boxes 31 onto a pallet 33. In FIG. 2C, the pallet 33 is disposed on top of an autonomous mobile robot (AMR) 34, but it should be appreciated that the capabilities of the robot 30*a* described in this example apply to building pallets not associated with an AMR. In this task, the robot 30*a* picks boxes 31 disposed above, below, or within shelving 35 of the warehouse and places the boxes on the pallet 33. Certain box positions and orientations relative to the shelving may suggest different box picking strategies. For example, a box located on a low shelf may simply be picked by the robot by grasping a top surface of the box with the end effector of the robotic arm (thereby executing a "top pick"). However, if the box to be picked is on top of a stack of boxes, and there is limited clearance between the top of the box and the bottom of a horizontal divider of the shelving, the robot may opt to pick the box by grasping a side surface (thereby executing a "face pick").

To pick some boxes within a constrained environment, the robot may need to carefully adjust the orientation of its arm to avoid contacting other boxes or the surrounding shelving. For example, in a typical "keyhole problem", the robot may only be able to access a target box by navigating its arm through a small space or confined area (akin to a keyhole) defined by other boxes or the surrounding shelving. In such scenarios, coordination between the mobile base and the arm of the robot may be beneficial. For instance, being able to translate the base in any direction allows the robot to position itself as close as possible to the shelving, effectively extending the length of its arm (compared to conventional robots without omnidirectional drive which may be unable to navigate arbitrarily close to the shelving). Additionally, being able to translate the base backwards allows the robot to withdraw its arm from the shelving after picking the box without having to adjust joint angles (or minimizing the degree to which joint angles are adjusted), thereby enabling a simple solution to many keyhole problems.

Of course, it should be appreciated that the tasks depicted in FIGS. 2A-2C are but a few examples of applications in which an integrated mobile manipulator robot may be used, and the present disclosure is not limited to robots configured to perform only these specific tasks. For example, the robots described herein may be suited to perform tasks including, but not limited to, removing objects from a truck or container, placing objects on a conveyor belt, removing objects from a conveyor belt, organizing objects into a stack, organizing objects on a pallet, placing objects on a shelf, organizing objects on a shelf, removing objects from a shelf, picking objects from the top (e.g., performing a "top pick"), picking objects from a side (e.g., performing a "face pick"), coordinating with other mobile manipulator robots, coordinating with other warehouse robots (e.g., coordinating with AMRs), coordinating with humans, and many other tasks.

Example Safety Systems and Methods

As robots move about a warehouse, such as robots 10*a*-10*c* in FIG. 2A, safety is a central concern. A loosely integrated mobile manipulator robot may include separate power supplies, separate controllers, and separate safety systems. In contrast, a highly integrated mobile manipulator robot, such as the embodiments of robots described herein, may include a single power supply shared across the mobile base and the robotic arm, a central controller overseeing operation of both the mobile base and the robotic arm, and/or holistic safety systems configured to monitor and, when appropriate, shut down the entire robot. For example, a safety system that is aware of the current state of both the robotic arm and the mobile base may appropriately define safe operating limits for the robotic arm and the mobile base that account for the motion of the other subsystem. In contrast, if a safety system associated with only the mobile base is unaware of the state of the robotic arm, the safety system of the mobile base must conservatively limit its operation to account for uncertainty about whether the robotic arm is operating in a potentially dangerous state. Similarly, if a safety system associated with only the robotic arm is unaware of the state of the mobile base, the safety system of the robotic arm must conservatively limit its operation to account for uncertainty about whether the mobile base is operating in a potentially dangerous state. A holistic safety system associated with a highly integrated mobile manipulator robot may be associated the comparatively less restrictive limits, enabling faster, more dynamic, and/or more efficient motions. In some embodiments, a mobile manipulator robot may include a dedicated safety-rated computing device configured to integrate with safety systems that ensure safe operation of the robot. Additional details regarding these safety systems and their methods of use are presented below.

As described above, a highly integrated mobile manipulator robot includes a mobile base and a robotic arm. The mobile base is configured to move the robot to different locations to enable interactions between the robotic arm and different objects of interest. In some embodiments, the mobile base may include an omnidirectional drive system that allows the robot to translate in any direction within a plane. The mobile base may additionally allow the robot to rotate about a vertical axis (e.g., to yaw). In some embodiments, the mobile base may include a holonomic drive system, while in some embodiments the drive system may be approximated as holonomic. For example, a drive system that may translate in any direction but may not translate in any direction instantaneously (e.g., if time is needed to reorient one or more drive components) may be approximated as holonomic.

In some embodiments, a mobile base may include sensors to help the mobile base navigate its environment. These sensors (and/or other sensors associated with the robotic arm, or another portion of the robot) may also allow the robot to detect potential safety concerns, such as a human approaching the robot while the robot is operating at high speeds. In the embodiment shown in FIGS. 1A and 1B, the mobile base 110 of the robot 100 includes distance sensors 116. The mobile base includes at least one distance sensor 116 on each side of the mobile base 110. A distance sensor may include a camera, a time of flight sensor, a LiDAR sensor, or any other sensor configured to sense information about the environment from a distance.

Some types of sensors (e.g., cameras, LiDAR sensors) may sense a region within a field of view of the sensor. A field of view may be associated with an angular value and/or a distance, or a field of view may be associated with a sector of a circle. In some embodiments of a mobile manipulator robot, the fields of view of the distance sensors may at least partially overlap. That is, at least one field of view may at least partially overlap a second field of view. In this way, the effective field of view of multiple distance sensors may be greater than the field of view achievable with a single distance sensor, enabling greater visibility of the robot's environment. It should be appreciated that the present disclosure is not limited to any specific arrangement of distance sensors and/or degree of overlap between different fields of view. In some embodiments, a field of view of each distance sensor may at least partially overlap with a field of view of at least one other distance sensor. In some embodiments, a field of view of each distance sensor may at least partially overlap with a field of view of at least two other distance sensors.

Figure 3:
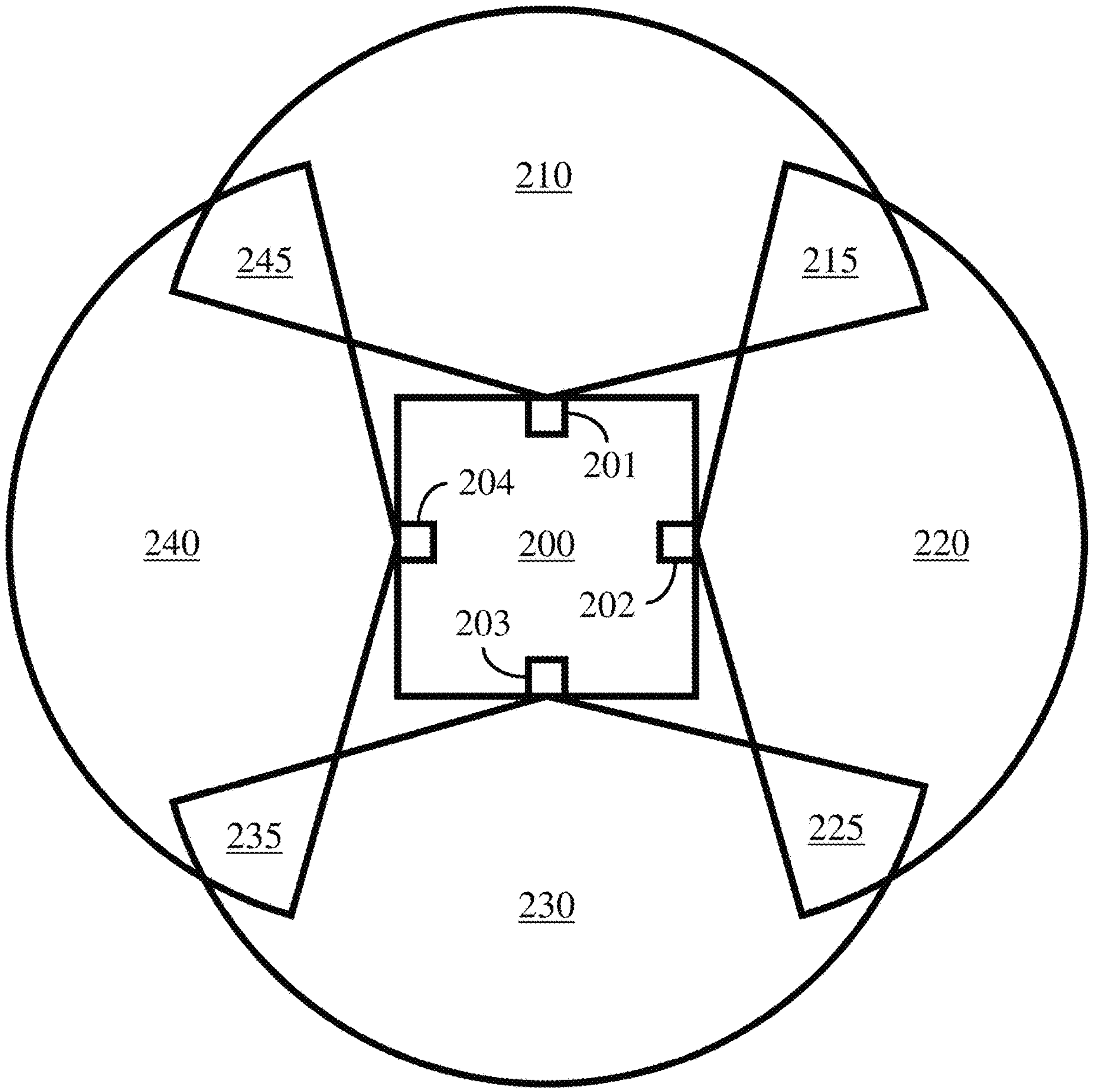
FIG. 3 is a top schematic view of one embodiment of overlapping fields of view of distance sensors of a robot.

The locations of the distance sensors and the associated fields of view may be arranged such that the field of view of each distance sensor at least partially overlaps the fields of view of the two neighboring distance sensors. In some embodiments, distance sensor fields of view may overlap continuously to provide a full 360-degree view of the environment around the robot. That is, in some embodiments, a combined field of view that includes the fields of view from all of the distance sensors is a 360-degree field of view. FIG. 3 depicts one embodiment of a mobile base 200 (e.g., a mobile base of an integrated mobile manipulator robot) with four sides (specifically, mobile base 200 is rectangular). A distance sensor is disposed on each of the four sides of the mobile base 200. Specifically, a first distance sensor 201 associated with a first field of view 210 is disposed on a first side of the mobile base, a second distance sensor 202 associated with a second field of view 220 is disposed on a second side of the mobile base, a third distance sensor 203 associated with a third field of view 230 is disposed on a third side of the mobile base, and a fourth distance sensor 204 associated with a fourth field of view 240 is disposed on a fourth side of the mobile base. The first field of view 210 overlaps the second field of view 220 in region 215, the second field of view 220 overlaps the third field of view 230 in region 225, the third field of view 230 overlaps the fourth field of view 240 in region 235, and the fourth field of view 240 overlaps the first field of view 210 in region 245. Accordingly, the first field of view 210 at least partially overlaps the second and fourth fields of view 220 and 240, and the third field of view 230 also at least partially overlaps the second and fourth fields of view 220 and 240. Additionally, the first and third fields of view 210 and 230 do not overlap (in the embodiment of FIG. 3).

Figure 4A:
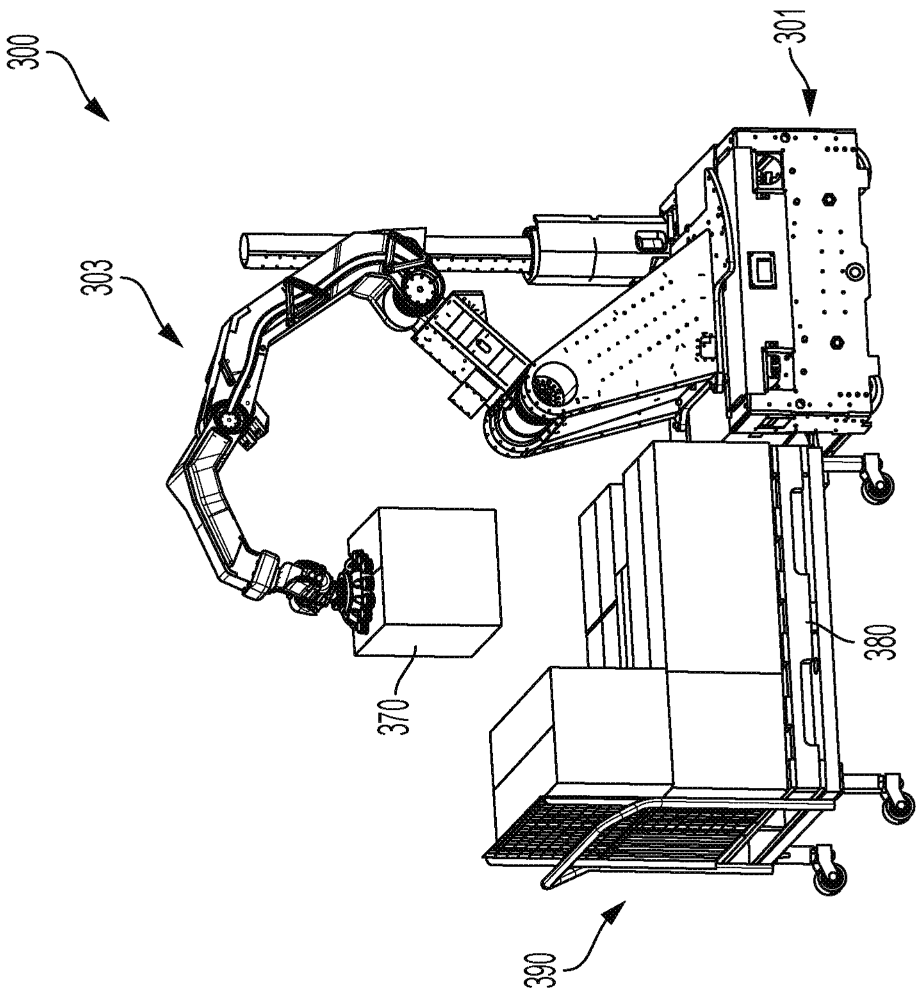
FIG. 4A depicts a robot coupled to a cart accessory.

Overlapping fields of view may be particularly beneficial when an object occludes a portion of a field of view of one distance sensor. For example, in some embodiments, a robot may couple to an accessory. FIG. 4A depicts a mobile manipulator robot 300 with a mobile base 301 and a robotic arm 303 coupled to a cart accessory 390. The cart accessory 390 may be configured to support a pallet 380 on which boxes 370 or other objects can be placed. The cart accessory 390 may be configured to connect and transmit information to the robot 300. For example, the cart accessory 390 may transmit information relating to the size and/or geometry of the cart accessory, and/or locations of its wheels. The robot 300 may integrate this information into its control and safety models, such that the robot 300 operates according to the parameters (e.g., mass, footprint) of the combined system (e.g., the combined system of the robot 300 and the cart accessory 390) and not just the parameters of the robot 300 itself.

Figure 4B:
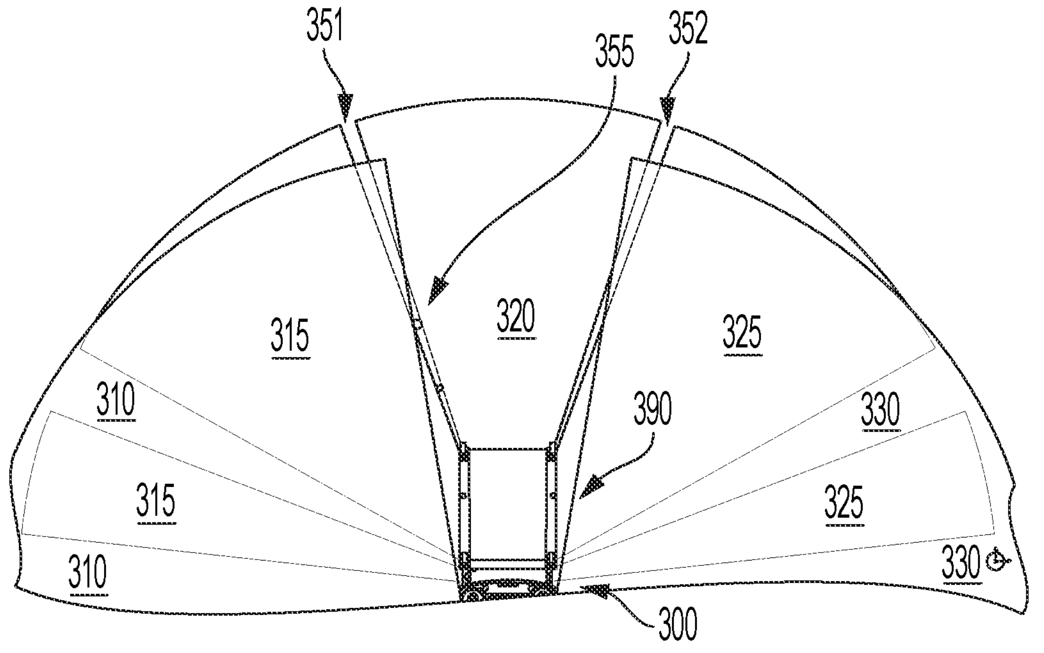
FIG. 4B is a top view of one embodiment of overlapping fields of view of distance sensors of the robot of FIG. 4A.
Figure 4C:
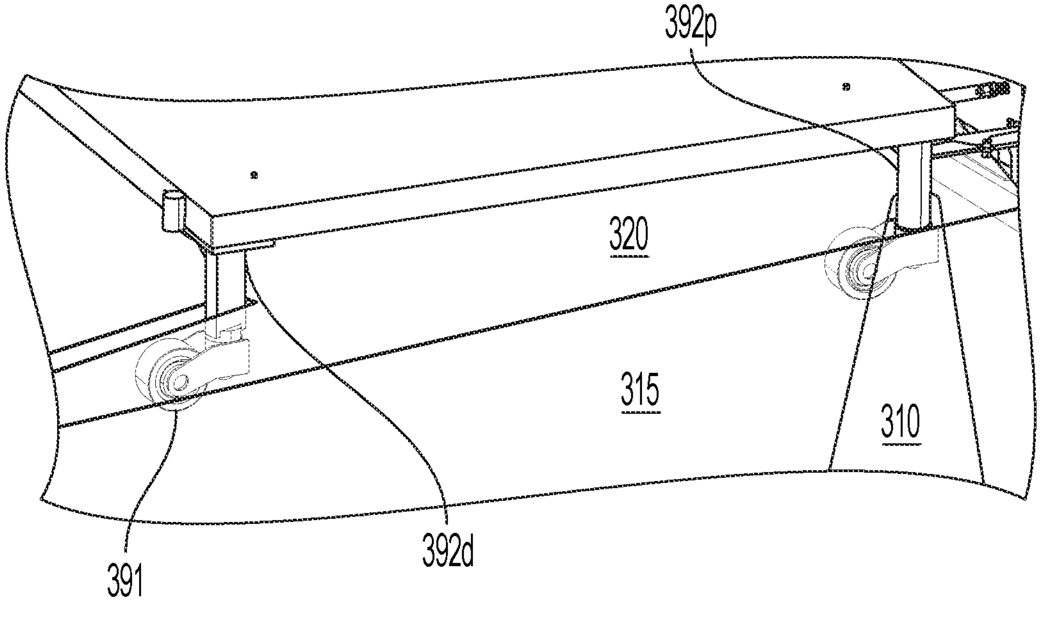
FIG. 4C is a perspective view of the overlapping fields of view of FIG. 4B.

As shown in FIGS. 4B and 4C, an accessory may occlude a portion of a field of view of a distance sensor of a robot to which the accessory is attached. FIG. 4B is a top view of the robot 300 coupled to the cart accessory 390 of FIG. 4A. The robot 300 includes multiple distance sensors, each of which is associated with a field of view. A first distance sensor on a first side of the robot 300 is associated with a first field of view 310 (indicated by the leftmost shaded sector in FIG. 4B), a second distance sensor on a second side of the robot 300 is associated with a second field of view 320 (indicated by the middle shaded sector in FIG. 4B), and a third distance sensor on a third side of the robot 300 is associated with a third field of view 330 (indicated by the rightmost shaded sector in FIG. 4B). The first and second fields of view overlap in regions 315, while the second and third fields of view overlap in regions 325. At least one field of view may include an area on a side of the accessory opposite the side of the accessory that couples to the robot (e.g., at least one distance sensor may be configured to sense an area behind the accessory). In the embodiment of FIGS. 4B and 4C, the second distance sensor associated with the second field of view 320 is configured to sense an area under as well as behind the cart accessory 390.

As can be appreciated in FIG. 4C, portions of an accessory (such as the wheels 391 and/or legs 392 of the cart accessory 390) may occlude portions of a field a view of one or more distance sensors on the robot 300. For example, as may be best seen in FIG. 4C, a leg of the cart accessory proximal to the robot occludes the second field of view 320, such that the second distance sensor is unable to sense an occluded area behind the leg (e.g., an area on a side of the leg opposite the distance sensor).

The inventors have recognized and appreciated that accessories may be designed and distance sensors may be arranged such that at least some of an area that is occluded from the field of view of one distance sensor may be included in the field of view of a different distance sensor, and such that the size of an area that is unable to be sensed by any of the distance sensors is limited. For example, as can be seen in FIGS. 4B and 4C, the majority of the area behind a proximal leg 392*p* (e.g., a leg proximal the robot 300) that is occluded from the second field of view 320 falls within the first field of view 310. Accordingly, the area occluded from the second field of view 320 by the proximal leg that is not contained within the first field of view 310 may be negligible.

In contrast, the areas behind the distal legs (e.g., distal leg 392*d* in FIG. 4C) that are occluded from the second field of view 320 (e.g., occluded areas 351 and 352 in FIG. 4B) may include larger portions that are also not contained within either the first or third fields of view 310 and 330. However, the maximum “blindspot” (e.g., the area not included in the field of view of any distance sensor) may nonetheless be limited. In FIG. 4B, a blindspot with a maximum dimension (e.g., a maximum diameter) is indicated at 355. The maximum dimension of the blindspot may depend at least in part on the positions, sensing angles, and sensing distances of the distance sensors, as well as the size and position of occluding bodies (e.g., the legs of a cart accessory). Considering these and other variables, the inventors have recognized and appreciated that a blindspot may be limited to a maximum dimension. For example, a maximum dimension of a blindspot may be limited in consideration of a size of a human leg or ankle, such that even if a person is standing behind an accessory (e.g., a cart accessory), at least a portion of the person’s leg may be able to be detected by at least one of the distance sensors. In some embodiments, the maximum dimension of a blindspot may be less than 100 millimeters, or, in some embodiments, less than 75 millimeters.

Figure 5:
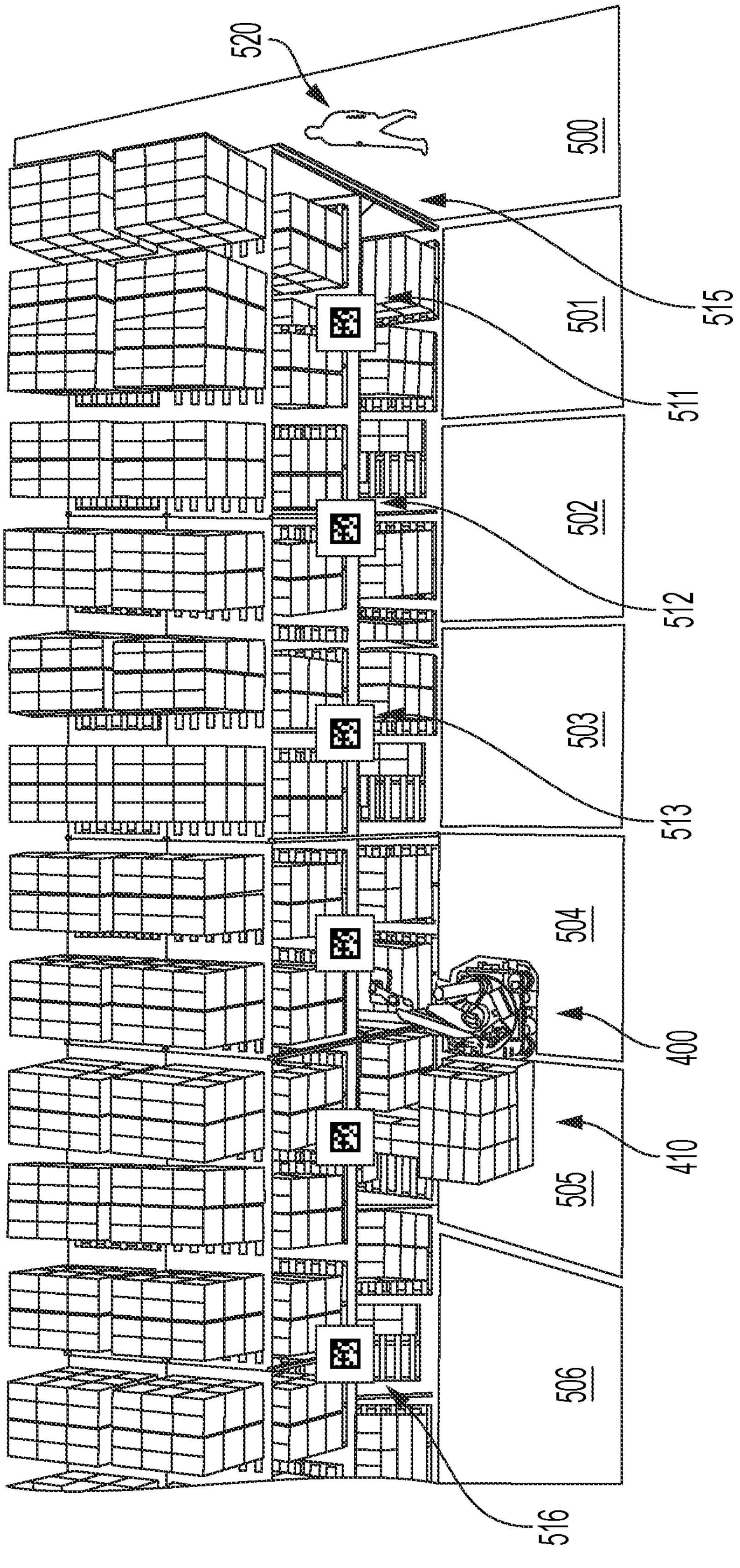
FIG. 5 depicts a robot operating in an aisle of a warehouse.

While the safety considerations described above may be generally applicable regardless of the location of a robot, the robot may additionally be configured to tailor its operation based on its position within an environment. FIG. 5 depicts a robot 400 operating within an aisle of a warehouse. In this embodiment, the robot 400 is coupled to a cart accessory 410. Due in part to certain safety considerations, the robot 400 may be configured to adjust its operation based on its position within the aisle. For example, an area 500 at the end of the aisle may be associated with certain safety considerations, as portions of the shelving 515 may occlude one or more sensors (e.g., distance sensors) of the robot 400. As such, a person 520 who walks around the corner of the shelving 515 from the area 500 at the end of the aisle may be undetectable by the robot 400 from a safe distance, and the person may (from the robot’s perspective) suddenly “appear” in the robot’s operating zone before there is sufficient time to enter a safe operating mode (e.g., reduce speeds, power down completely). In this type of scenario, the person 520 may unsafely enter the robot’s operating zone while the robot is operating at high speeds. Accordingly, it may be desirable to prevent this type of scenario altogether.

To account for these situations, the aisle may be divided into zones (e.g., zones 501-506) based on, for example, a distance to the end of the aisle (e.g., area 500). Generally, a robot may be constrained to operate more conservatively the closer it is to the end of an aisle, to avoid the potentially dangerous scenario described above. In some embodiments, zones of a warehouse aisle (or of another area of a warehouse or of another environment) may be defined based on parameters other than a distance to the end of the aisle (or some other distance), as the disclosure is not limited in this regard. Additionally, while discrete zones are depicted in FIG. 5, it should be appreciated that an area of an environment may be classified in a more continuous manner. Returning specifically to FIG. 5, each zone 501-506 is associated with a zone ID tag 511-516 (respectively). A zone ID tag may be any indicator that is detectable by a robot that informs the robot of the zone and/or any information relating to the zone. For example, the zone ID tag may be a visual indicator (e.g., a fiducial marker, or a human-readable sign), an RFID tag, an IR emitter, a Bluetooth module, or any other location-based indicator. The zone ID tag may communicate information regarding the size and/or boundaries of the zone, the location of the zone relative to a location of interest (e.g., an end of an aisle), and/or safe operating limits of the robot while it is within the zone. In some embodiments, a zone ID tag may communicate location-based information to the robot, and the robot may determine safe operating limits based on the location-based information (e.g., from a look-up table stored in memory). In some embodiments, a zone ID tag may not communicate any location-based information to the robot, but rather may directly communicate safe operating limits for the robot while the robot is inside the zone. In these cases, the safe operating limits associated with a particular zone may be updated in real time (e.g., by a central monitoring system) to reflect a change in environmental conditions. For example, if a person enters an aisle in which a robot is operating, the safe operating limits associated with the zone in which the robot is operating may be adjusted (e.g., reduced speed limits may be enforced) to reflect the fact that a person is within the vicinity of the robot.

As a specific example, while the robot 400 of FIG. 5 is within zone 501, no manipulation of any kind may be permitted. While in zone 502, only low arm velocities may be permitted, and an orientation of the robot 400 may be constrained. For example, the robot may be constrained to orient toward the center of the aisle (e.g., toward zones 503-506 and away from zone 501), such that the robotic arm does not operate too close to the area 500 at the end of the aisle. In zone 503, there may be a low arm velocity constraint, but no orientation constraint. In zones 504 and above (e.g., in zones 505 and 506, and other zones (not shown in FIG. 5) closer to the center of the aisle), the robot may have no special operating constraints based on its location within the aisle.

Figure 6:
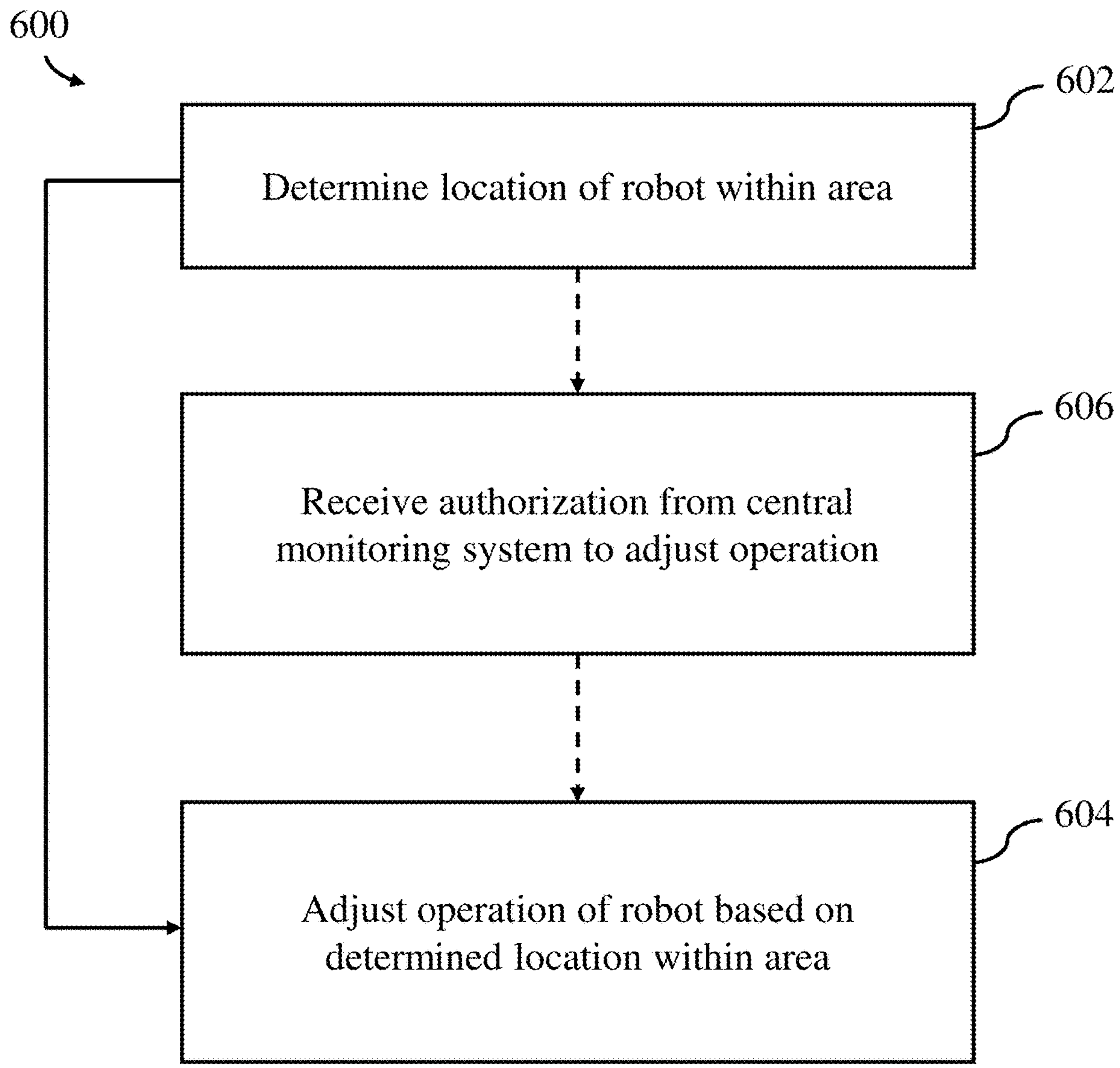
FIG. 6 is a flowchart of one embodiment of a method of safely operating a robot.

FIG. 6 is a flowchart of one embodiment of a method 600 of safely operating a robot within an area of an environment (e.g., within a warehouse). An area of an environment may include an aisle of a warehouse, an area surrounding a conveyor, a loading dock of a warehouse, an area inside or near a truck, or any other area, as the disclosure is not limited in this regard.

At act 602, a location of the robot within the area is determined. Determining the location of the robot within the area may include determining a zone of the area within which the robot is located, as described above in relation to FIG. 5. In some embodiments, determining the zone may include sensing a zone ID tag, as also described above in relation to FIG. 5. Redundant location information may be used in some embodiments, such that a robot receives location information from multiple sources. For example, a robot may both sense an RFID tag as well as process visual information (e.g., detect landmarks) to determine its location. In some embodiments, information from different types of sensors may be integrated using sensor fusion, which may have certain benefits relating to robustness. Signal redundancy may be particularly advantageous in matters of robot safety, in which the robot should be able to sustain failure of a sensor (or even a type of sensor) and still operate safely or safely transition to a safe mode. In some embodiments, a robot may receive location information from a monitoring system (e.g., a central monitoring system of a warehouse). For example, referring to FIG. 1B, a robot 100 may receive location information via an antenna 160.

At act 604, an operation of the robot may be adjusted based, at least in part, on the determined location within the area. Adjusting an operation of the robot may include one or more of adjusting a speed limit of a robotic arm of the robot, adjusting a speed limit of a mobile base of the robot, adjusting speed limits of both the robotic arm and the mobile base, adjusting a direction of motion of the robot, adjusting an orientation of the robot, causing one or more safety indicators (e.g., lights, sound emitting devices) on the robot to change state (e.g., turn on/off, change color), and/or any other appropriate adjustment of an operation of a robot. A few specific examples of operation adjustments based on location have been provided above in reference to FIG. 5. As additionally noted above, a zone ID tag may not only communicate location-based information, but may additionally or alternatively include information regarding safe operating limits for a robot within the associated zone. As such, adjusting operation of the robot may include adjusting operation based on a sensed zone ID tag.

In some embodiments, the method 600 may include act 606, in which the robot receives authorization from a central monitoring system to adjust its operation. A robot may be prevented from performing certain operations (e.g., operating the mobile base at high speeds, operating the robotic arm in any capacity, or generally operating in modes deemed to be unsafe) unless the robot receives authorization (e.g., wirelessly via an antenna) from a central monitoring system. In some cases, the central monitoring system may transmit a signal that may include various environmental information and/or authorization (e.g., "Zone 1 is safe—high speed operation is permitted", "A person is in Zone 7—power down immediately"). The signal from the central monitoring system may be transmitted continuously or at a prescribed frequency in some embodiments. Accordingly, a robot may perform continuous checks for authorization, and cease some (or all) operations if a signal from the central monitoring system is not received at the last authorization check. In embodiments in which the robot receives authorization from a central monitoring system, operation of the robot may be adjusted based, at least in part, on the determined location within the area and the received authorization. It should be appreciated that in some embodiments, some operation adjustments may require receiving authorization whereas other operation adjustments may not. In some embodiments, a robot may never enter an unsafe mode without first receiving authorization from a central monitoring system.

As described above, a robot may detect a location in which it is located (e.g., a zone of an aisle), and may adjust its operation accordingly so that it may operate within the safety constraints associated with its location. Alternatively or additionally, a robot may operate within safety constraints imposed by one or more buffer zones. A buffer zone may define an area around the robot such that the robot may only operate in certain modes (e.g., at high speeds) when no hazards (e.g., humans) are detected to be located within the buffer zone. A size of a buffer zone may depend on both the robot (e.g., on robotic arm joint torques, arm length, arm orientation, speed of mobile base, braking time) and the nature of the defined hazards (e.g., typical human walking speed, maximum human running speed). In some embodiments, a buffer zone may include a circular area with a specified radius (wherein the robot is disposed at the center of the circle). In some embodiments, a radius of a buffer zone may be five meters, while in some embodiments a radius of a buffer zone may be ten meters. Of course, other sizes and/or shapes of buffer zones may be appropriate, and it should be appreciated that the present disclosure is not limited in this regard.

Figure 7:
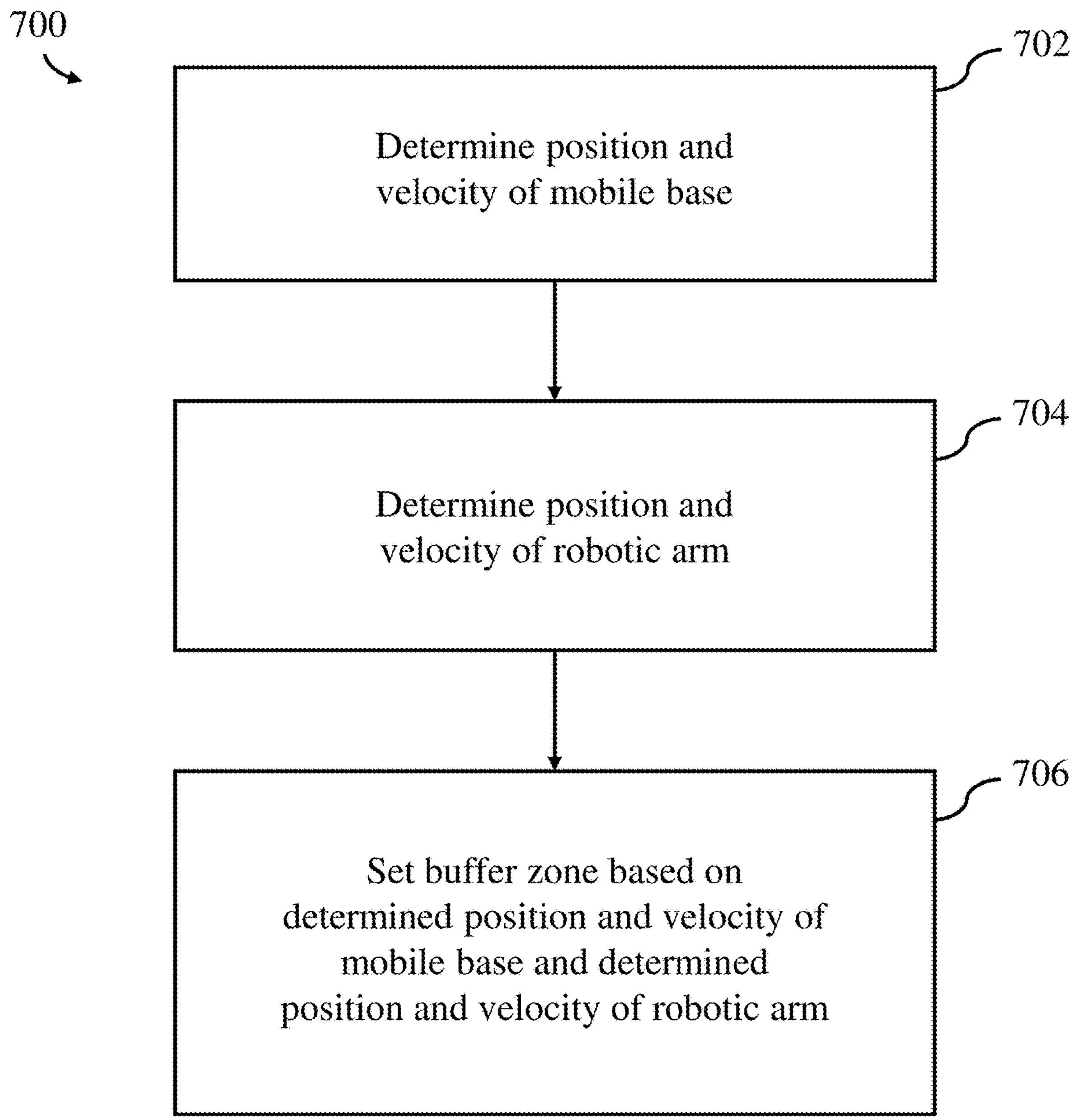
FIG. 7 is a flowchart of one embodiment of a method of setting a buffer zone for a robot.

FIG. 7 is a flowchart of one embodiment of a method 700 of setting a buffer zone within which a robot can safely operate. At act 702, a position and a velocity of a mobile base of the robot are determined. At act 704, a position and a velocity of a robotic arm of the robot are determined. At act 706, a buffer zone for the robot is set based, at least in part, on the determined position and velocity of the mobile base and the determined position and velocity of the robotic arm. As will be readily appreciated, higher robot speeds (whether associated with the mobile base, the robotic arm, or both) may be associated with longer stopping times, and thus may be associated with a larger buffer zone. Accordingly, it may be advantageous to limit certain operations of a robot in certain scenarios to control the size of the buffer zone. For example, while a robot is navigating from one location to another using the mobile base, the robotic arm may not need to be used. As such, the arm may be stowed (e.g., retracted into the footprint of the base and powered down) during such navigation. In this operating configuration, the spatial extent and the speed of the arm are reduced, and thus the size of the robot's overall buffer zone may be reduced accordingly, allowing the robot to enter more confined areas safely.

In some embodiments, the method 700 may additionally include adjusting the buffer zone upon determining that any one (or a combination) of the above factors (e.g., a position of the mobile base, a velocity of the mobile base, a position of the robotic arm, and/or a velocity of the robotic arm) have changed. In some embodiments, the method 700 may additionally include initiating safety protocols upon detecting an unanticipated environmental change, such as detecting an unanticipated object within the buffer zone.

Control of one or more of the robotic arm, the mobile base, the turntable, and the perception mast may be accomplished using one or more computing devices located on-board the mobile manipulator robot. For instance, one or more computing devices may be located within a portion of the mobile base with connections extending between the one or more computing devices and components of the robot that provide sensing capabilities and components of the robot to be controlled. In some embodiments, the one or more computing devices may be coupled to dedicated hardware configured to send control signals to particular components of the robot to effectuate operation of the various robot systems. In some embodiments, the mobile manipulator robot may include a dedicated safety-rated computing device configured to integrate with safety systems that ensure safe operation of the robot.

The computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the terms "physical processor" or "computer processor" generally refer to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that embodiments of a robot may include at least one non-transitory computer-readable storage medium (e.g., a computer memory, a portable memory, a compact disk, etc.) encoded with a computer program (i.e., a plurality of instructions), which, when executed on a processor, performs one or more of the above-discussed functions. Those functions, for example, may include control of the robot and/or driving a wheel or arm of the robot. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

The invention claimed is:

1. A robot comprising:

a mobile base comprising a top surface, a bottom surface arranged opposite the top surface, and a set of wheels coupled to the bottom surface;

a robotic arm operatively coupled to the mobile base, the robotic arm configured to rotate relative to the mobile base about a first axis, the first axis extending in a direction normal to the top surface of the mobile base;

a suction-based gripper coupled to the robotic arm;

at least one antenna configured to receive one or more signals from a monitoring system external to the robot; and a computer processor configured to:

determine a location of the robot within an environment of the robot;

set an operational limit on an operating speed of the robotic arm and/or a positioning of the robotic arm relative to the mobile base while the robot is located at the location within the environment of the robot;

adjust the operational limit based, at least in part, on the one or more signals received by the at least one antenna; and control the robot to perform one or more operations according to the operational limit.

2. The robot of claim 1, further comprising a plurality of distance sensors.

3. The robot of claim 2, wherein the mobile base is rectangular, and wherein at least one of the plurality of distance sensors is disposed on each side of the mobile base.

4. The robot of claim 2, wherein a field of view of each distance sensor of the plurality of distance sensors at least partially overlaps with a field of view of at least one other distance sensor of the plurality of distance sensors.

5. The robot of claim 4, wherein the field of view of each distance sensor of the plurality of distance sensors at least partially overlaps with a field of view of each of at least two other distance sensors of the plurality of distance sensors.

6. The robot of claim 2, wherein:

a field of view of a first distance sensor of the plurality of distance sensors at least partially overlaps with a field of view of a second distance sensor of the plurality of distance sensors and a field of view of a third distance sensor of the plurality of distance sensors; and a field of view of a fourth distance sensor of the plurality of distance sensors at least partially overlaps with the field of view of the second distance sensor and the field of view of the third distance sensor.

7. The robot of claim 6, wherein the mobile base comprises four sides, wherein:

the first distance sensor is disposed on a first side of the four sides of the mobile base;

the second distance sensor is disposed on a second side of the four sides of the mobile base;

the third distance sensor is disposed on a third side of the four sides of the mobile base; and the fourth distance sensor is disposed on a fourth side of the four sides of the mobile base.

8. The robot of claim 6, wherein the field of view of the first distance sensor and the field of view of the fourth distance sensor do not overlap, and wherein the field of view of the second distance sensor and the field of view of the third distance sensor do not overlap.

9. The robot of claim 2, wherein each distance sensor of the plurality of distance sensors is associated with a field of view, wherein a combined field of view that includes the fields of view from all of the plurality of distance sensors is a 360-degree field of view.

10. The robot of claim 2, further comprising a wheeled accessory coupled to the mobile base, wherein a wheel of the wheeled accessory occludes an area of a first field of view of a first distance sensor of the plurality of distance sensors, and wherein a second field of view of a second distance sensor of the plurality of distance sensors includes at least a portion of the occluded area of the first field of view.

11. The robot of claim 2, wherein the plurality of distance sensors are configured to detect sensor data in the environment of the robot, and wherein the computer processor is further configured to:

determine a buffer zone around the robot; and further adjust the operational limit when the sensor data indicates a presence of an object within the buffer zone.

12. The robot of claim 1, further comprising a wheeled accessory coupled to the mobile base.

13. The robot of claim 1, wherein the at least one antenna is configured to receive the one or more signals wirelessly.

14. The robot of claim 13, further comprising a perception mast operatively coupled to the mobile base, wherein the perception mast comprises a plurality of sensors, and wherein the at least one antenna is mounted on the perception mast.

15. The robot of claim 1, wherein:

the robot is configured to operate in an environment having a set of zones, each zone in the set of zones corresponding to a physical region of the environment;

determining the location of the robot within the environment of the robot comprises determining that the robot is located within a first zone of the set of zones within the environment;

setting the operational limit on the operating speed of the robotic arm and/or the positioning of the robotic arm relative to the mobile base while the robot is located at the location within the environment of the robot comprises setting the operational limit while the robot is located within the first zone; and adjusting the operational limit based, at least in part, on the one or more signals received by the at least one antenna comprises adjusting the operational limit while the robot is located within the first zone.

16. The robot of claim 1, wherein further comprising a turntable configured to rotate about the first axis, wherein the robotic arm is coupled to the turntable.

* * * * *